United States Patent [19]

Boserup

[11] 4,056,198
[45] Nov. 1, 1977

[54] TRANSFER AND TURNOVER MECHANISM FOR USE WITH POWER PRESS OR THE LIKE

[75] Inventor: Hans C. Boserup, Elmwood Park, Ill.

[73] Assignee: Danly Machine Corporation, Chicago, Ill.

[21] Appl. No.: 671,106

[22] Filed: Mar. 29, 1976

[51] Int. Cl.² .............................................. B65G 47/90
[52] U.S. Cl. ............................... 214/1 BC; 214/1 BD; 214/1 BH; 214/1 BV; 214/1 QA; 214/147 T; 214/301; 214/309
[58] Field of Search ...................... 214/1 R, 1 B, 1 BS, 214/301, 1 BB, 1 BT, 1 BC, 1 BH, 1 BD, 1 BV, 147 T, 148, 309, 149, 1 Q, 1 QA

[56] References Cited

U.S. PATENT DOCUMENTS

| 2,731,668 | 1/1956 | Miner | 214/1 BC X |
|---|---|---|---|
| 3,099,970 | 8/1963 | Hite | 214/1 BD X |
| 3,232,446 | 2/1966 | Spurr et al. | 214/1 BD |
| 3,561,614 | 2/1971 | Tezuka et al. | 214/1 BD |
| 3,587,888 | 6/1971 | Warren | 214/1 BV X |
| 3,617,054 | 11/1971 | Schilling | 214/1 BD X |
| 3,915,312 | 10/1975 | Clark | 214/1 BB |

*Primary Examiner*—Frank E. Werner

*Attorney, Agent, or Firm*—Leydig, Voit, Osann, Mayer & Holt, Ltd.

[57] ABSTRACT

A transfer mechanism for transferring a large generally flat workpiece into and out of a power press, or between adjacent power presses, including a pair of spaced stands having respective gear boxes swingably mounted thereon with reversible drive means for oscillating the gear boxes in unison through 180° from a first horizontal position downwardly and then upwardly to a second horizontal position with subsequent return along the same path to the first position. The gear boxes carry coaxial stubshafts with arms of equal length mounted thereon and with grippers at the ends of the arms for gripping the lateral edges of the workpiece. Each of the gear boxes has an input gear which is coaxial with the oscillation axis and anchored to the associated stand as well as an output gear which is connected to the associated stubshaft, the input gear being twice the diameter of the output gear and having the same directionality so that as the gear boxes are swung from first to second position the arms are swung from a first horizontal position to a second horizontal position extending in the opposite direction, the grippers being operated cyclically and in unison for gripping and depositing a workpiece.

27 Claims, 18 Drawing Figures

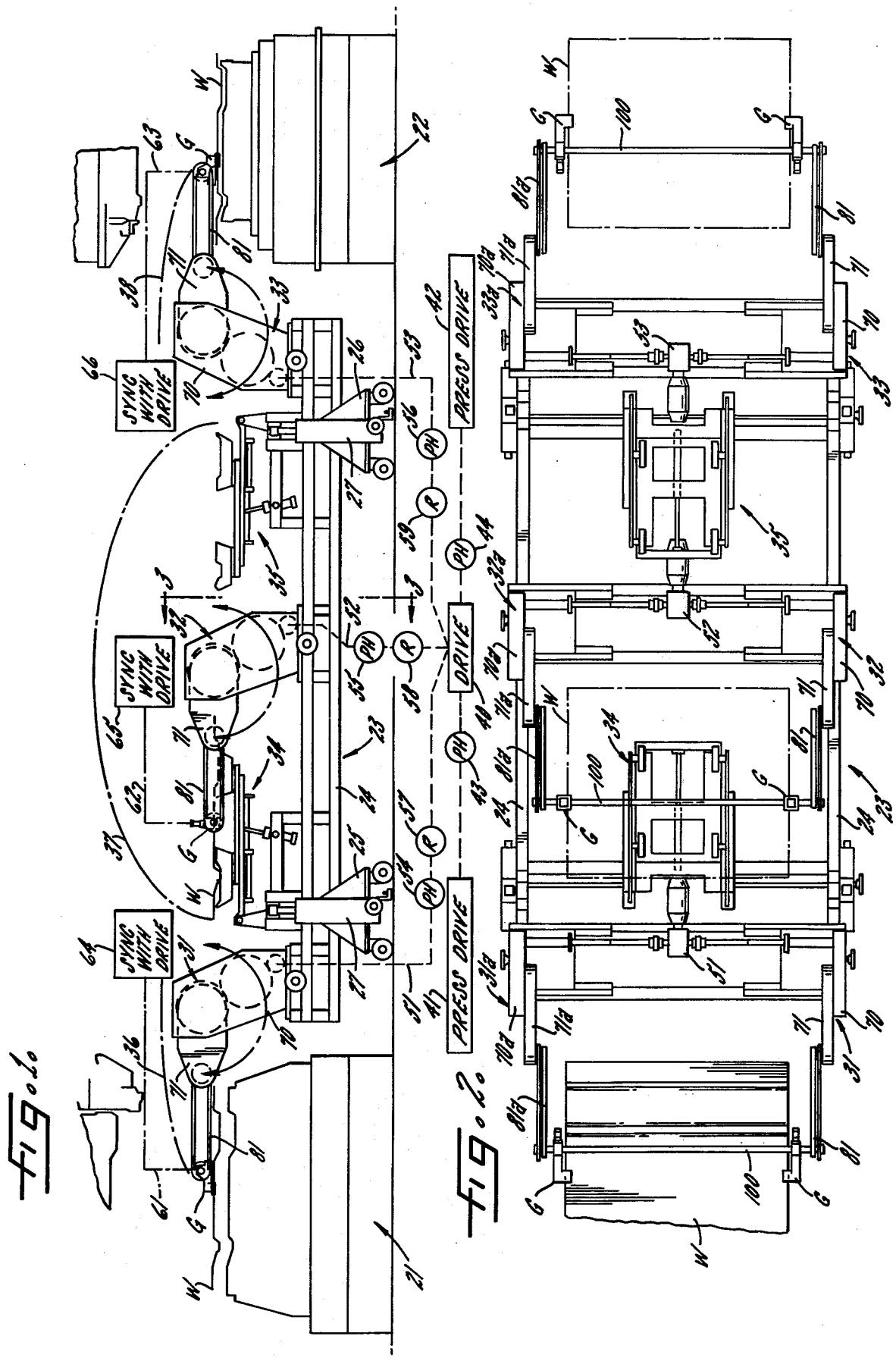

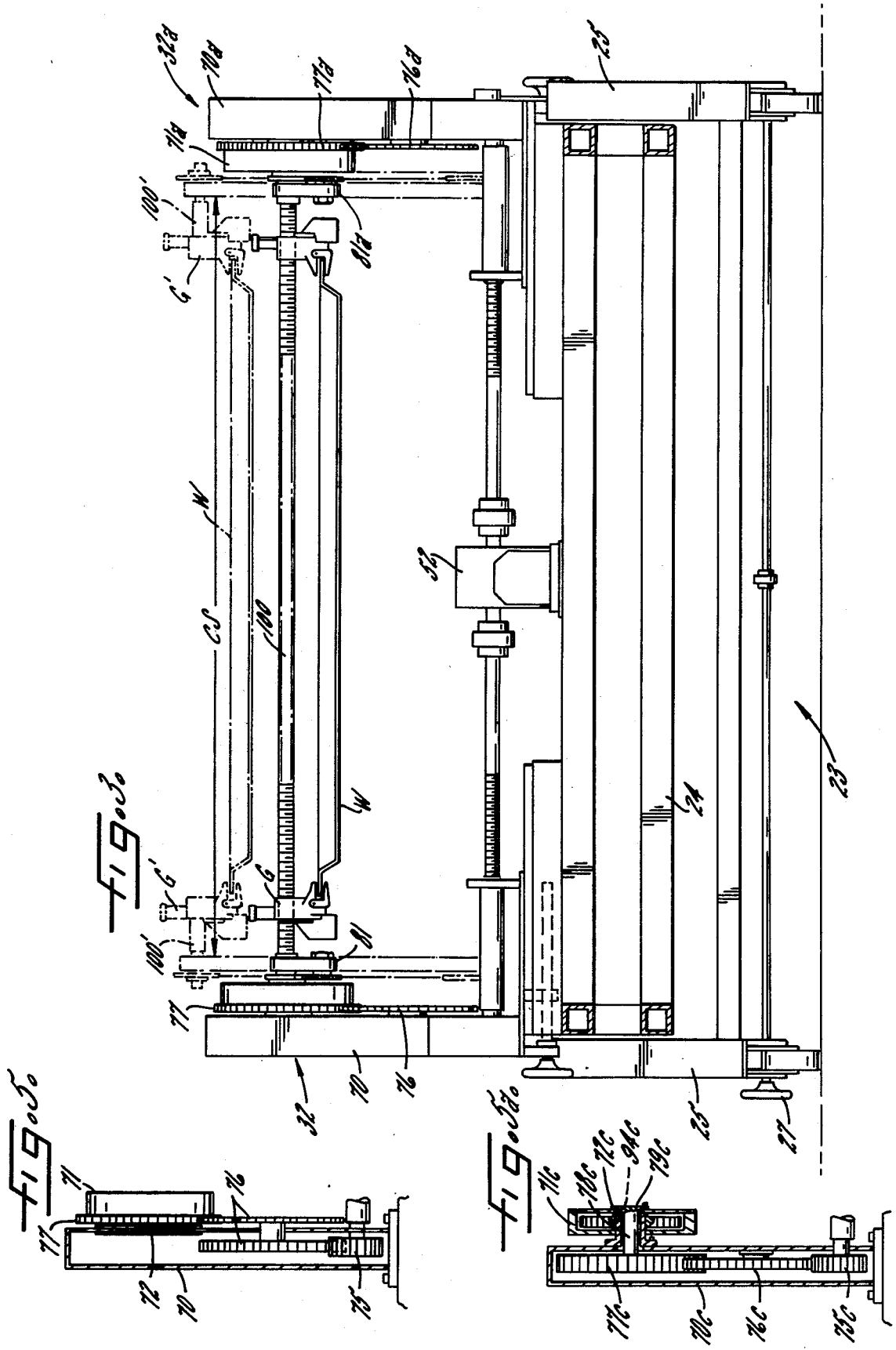

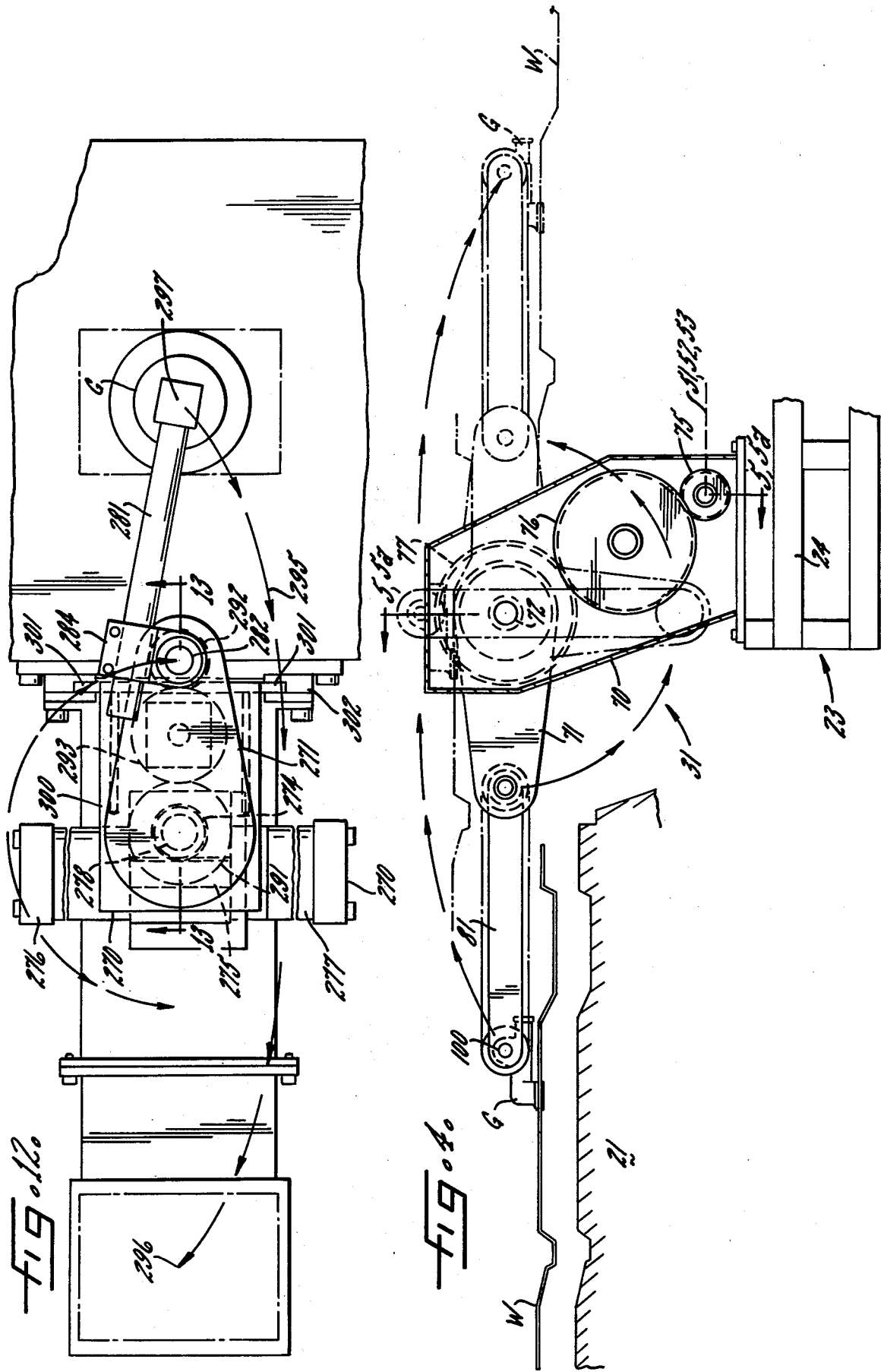

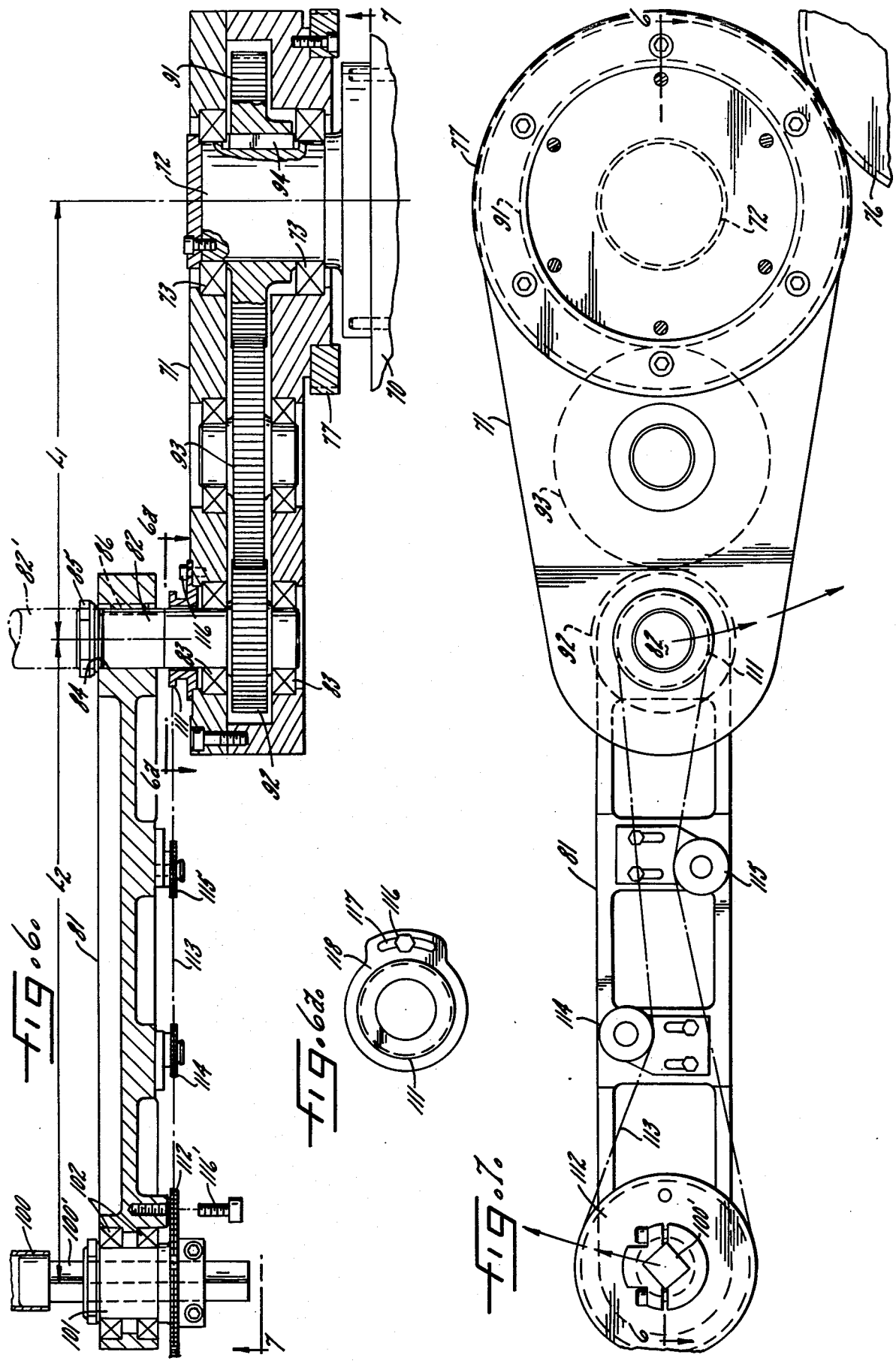

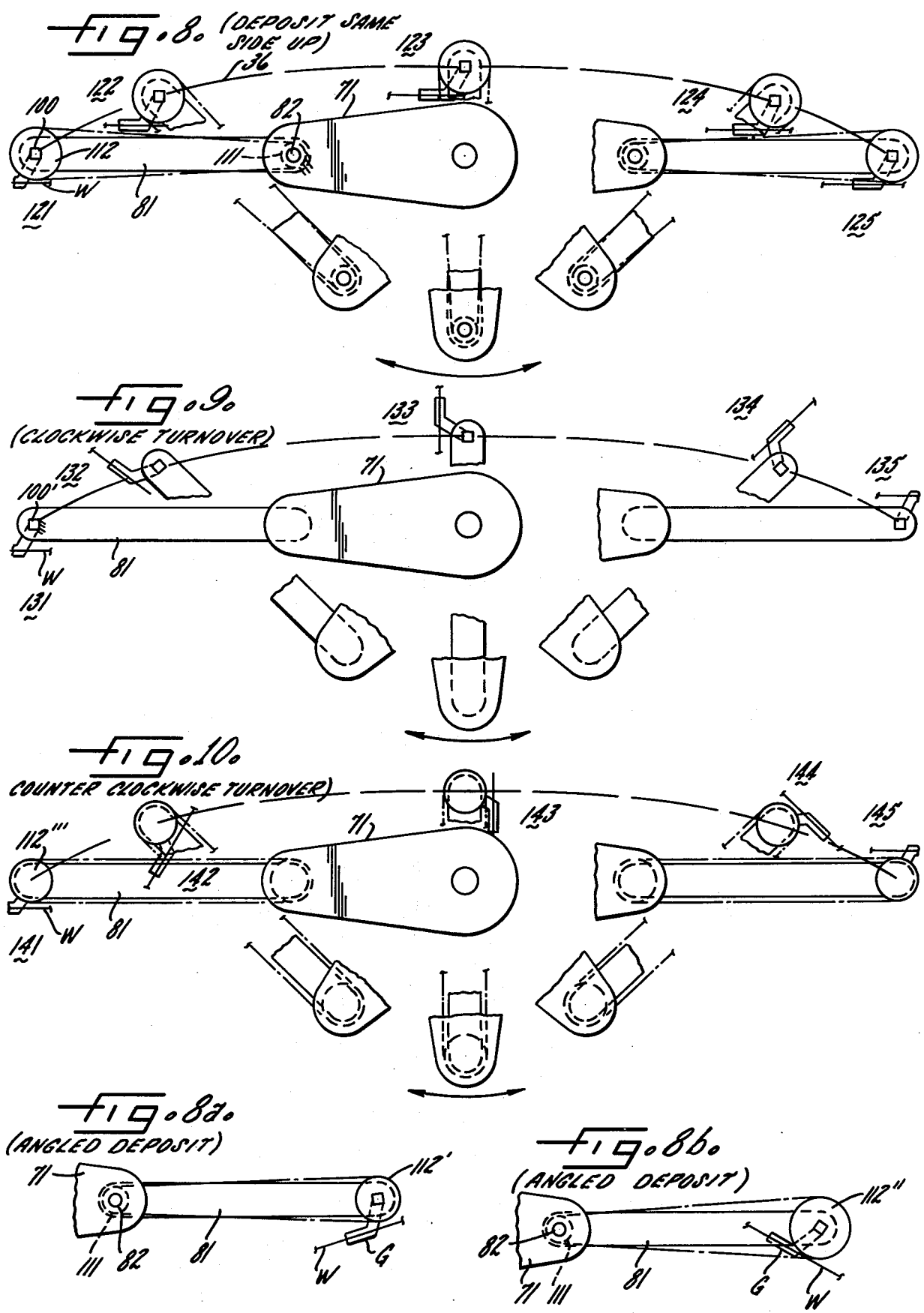

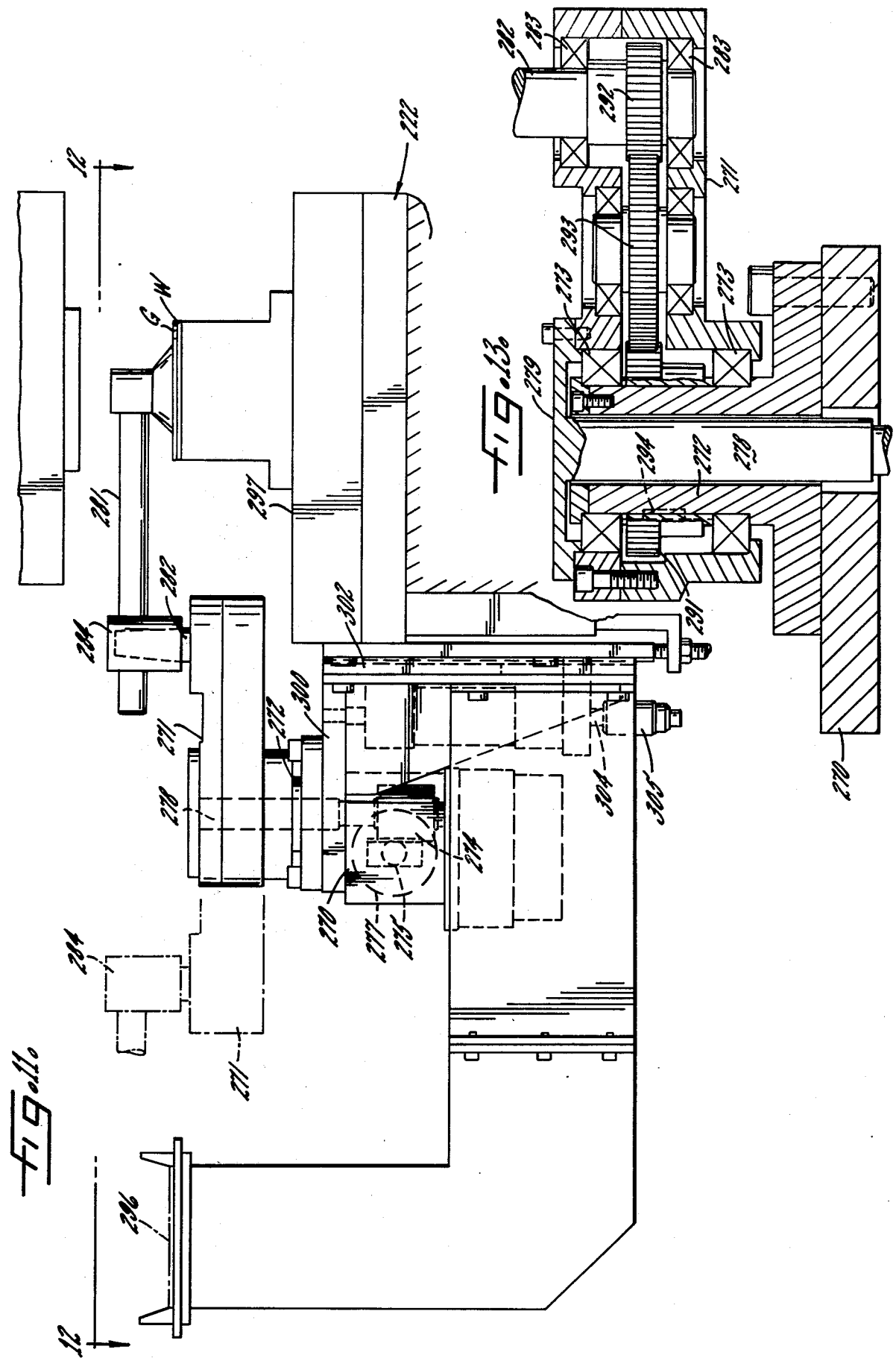

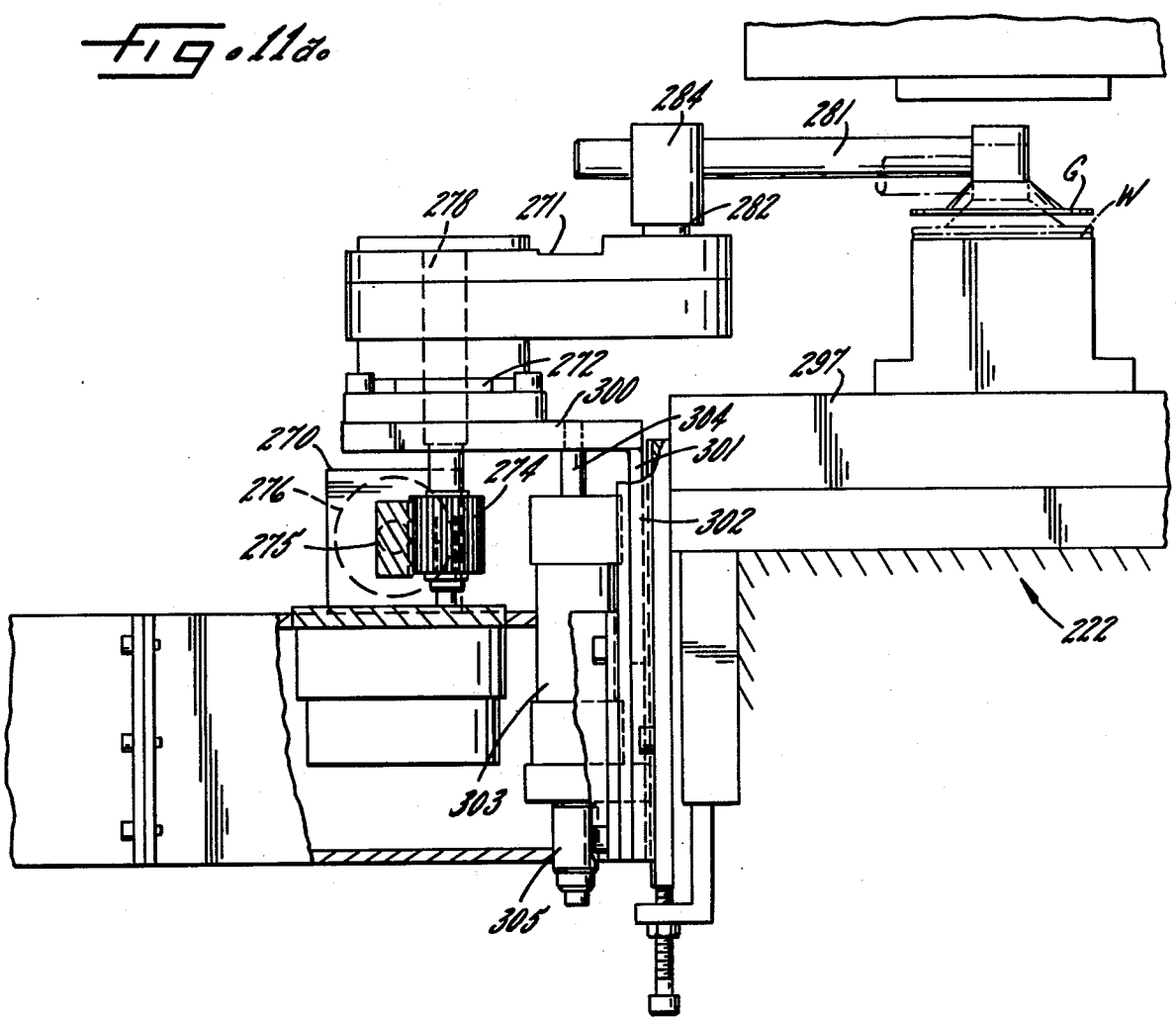

TRANSFER AND TURNOVER MECHANISM FOR USE WITH POWER PRESS OR THE LIKE

Linkages made up of relatively scissoring arms have been available over the years to produce straight line movement for various purposes as, for example, in Tomer U.S. Pat. No. 952,383 which issued in 1910, MacKnight U.S. Pat. No. 2,572,874 which issued in 1951, Wiley U.S. Pat. No. 2,832,661 which issued in 1958, and Blatt U.S. Pat. No. 3,401,568 which issued in 1968. As far as is known, however, no one has successfully adapted linkages of this general type to the loading and unloading of power presses and the like for accommodation of large heavy workpieces with modification of the straight line path to a shallow arcuate path in which a workpiece is removed with an upward component of motion from a first receptacle, such as a die or nest, and deposited with a downward component of motion in a second receptacle.

It is accordingly an object of the present invention to provide a transfer mechanism for a power press or the like which is simple and economical in construction, as compared to prior transfer devices, and which is inherently compact having a long reach as compared to the size of its component parts.

It is a further and related object to provide a transfer mechanism for a power press which is capable of loading and unloading a press die under conditions of limited head space, with the workpiece being removed and deposited substantially edgewise. Nevertheless it is an object to provide a transfer mechanism which imparts an upward "lift" at the point of removal and "lowering" of the workpiece into a seated position at point of deposit.

It is another object of the invention to provide a transfer mechanism for a power press which is highly versatile, being capable of translating the workpiece for depositing with the same side up or, alternatively, inverting the workpiece during the course of transfer to achieve turnover with the workpiece either rotated clockwise or counterclockwise as may be desired.

It is a more specific object to provide a transfer mechanism which is capable of picking up or depositing a workpiece at an angle with respect to the horizontal, either by a simple phase adjustment or a slight change in the drive ratio in one direction or the other.

It is a general object to provide a mechanism which is capable of transferring a wide variety of sizes and shapes of workpieces including sections of automobile bodies and especially where such workpieces must be transferred rapidly from press to press in an automatic press line, either face-up or inverted. In this connection, it is an object to provide a transfer mechanism for transferring large heavy workpieces but in which the force of gravity on the workpiece and mechanism is substantially self-cancelling enabling the mechanism to be operated with a minimum of power. Thus it is an object to provide a transfer mechanism which may be easily driven and operated at high transfer rates, rates as high as may be achieved in a rapidly operating press line of modern design.

It is a further object to provide a transfer mechanism which is well adapted for use in multiple for transfer between widely separated presses.

It is an object, in one of the aspects of the invention, to provide a mechanism which can be employed with advantage in two different orientations: with swinging movement in a vertical plane, using pairs of arms, for transfer between large presses or with swinging movement in a horizontal plane as suited to the servicing of smaller pieces.

Other objects and advantages of the invention will become apparent upon reading the attached detailed description and upon reference to the drawings in which:

FIG. 1 is an elevational view of a transfer assembly for transferring a workpiece between adjacent power presses, the assembly in the present instance including three transfer mechanisms in accordance with the present invention, and with only portions of the process being shown.

FIG. 2 is a plan view of the transfer assembly shown in FIG. 1.

FIG. 3 is a transverse section taken through the assembly and looking along line 3—3 in FIG. 1.

FIG. 4 is an elevational view, in partial section, showing a stand and associated gear box and arm in the act of trasnfer.

FIG. 5 and 5a show two different forms of stand construction both looking along line 5,5a—5,5a in FIG. 4.

FIG. 6 is a horizontal section taken through a gear box and arm along line 6—6 in FIG. 7.

FIG. 6a is a sectional view looking along line 6a—6a of FIG. 6.

FIG. 7 is a fragmentary elevation looking along line 7—7 in FIG. 6.

FIG. 8 is a stop motion diagram showing removal and deposit of a workpiece with the same side up.

FIG. 8a is a fragmentary diagram showing angled deposit of a workpiece.

FIG. 8b is a similar diagram showing deposit of a workpiece in oppositely angled orientation.

FIG. 9 is a similar diagram showing operation of the mechanism to achieve turnover.

FIG. 10 is a diagram showing a modified structure for achieving turnover.

FIGS. 11 and 11a are two views of a modified form of the invention utilizing a single gear box and arm.

FIG. 12 is a plan view looking along line 12—12 in FIG. 11.

FIG. 13 is a fragmentary elevation through the gear box taken along the line 13—13 in FIG. 12.

While the invention has been described in connection with certain preferred embodiments, it will be understood that it is not intended to limit the invention to the particular embodiment shown but it is, on the contrary, intended to cover the various alternative and equivalent forms of the invention in accordance with the spirit and scope of the appended claims.

Turning now to the drawings and particularly to FIGS. 1-3, there is shown a press transfer assembly, indicated at 20, for transferring a workpiece W from a first power press 21 to a second power press 22. The transfer assembly is coordinated upon a carriage 23 which bridges the space between the presses, the carriage 23 having a longitudinal frame 24 supported upon wheeled trucks 25, 26 which may be immobilized in working position and which include jacks 27 for individual height adjustment.

Mounted upon the frame 24 are three transfer mechanisms constructed in accordance with the invention, a first or left-hand, unit 31, a central unit 32, and a right-hand unit 33. Interposed between them are adjustable nests 34, 35 which act to support a workpiece temporarily between the time that it is deposited by one unit and removed by the next. It will be understood that all three of the transfer units, or mechanisms, are identical in construction, and the same reference numerals will accordingly be applied to each, as may be applicable.

While a discussion of the details of operation will be reserved, it will suffice, in connection with FIG. 1, to state that each mechanism is equipped with grippers G for gripping the lateral edges of a workpiece W, transferring the workpiece from the press 21 along the shallow arcuate path 36 into nest 34. The workpiece is then transferred from the nest along a second shallow arcuate path 37 into the second nest 35. From the latter the workpiece is transferred along path 38 into the lower die of the press 22. The transfer along the paths 36, 37, 38 may be with or without turnover of the workpiece, as will be seen.

While the details of synchronization are outside the scope of the present invention, synchronizing means are amply disclosed in the prior art. It will be adequate to say that the individual press drives, indicated at 41, 42 may be synchronized, for example, by coupling to a central drive or control 40 via suitable phasing means diagrammatically indicated at 43, 44. Mechanical connections 51, 52, 53 may lead from the drive 40 to the individual transfer mechanisms 31, 32, 33 respectively, via phasing means diagrammatically indicated at 54, 55, 56. Interposed in the mechanical connections are reversing devices 57, 58 and 59 to drive the gear boxes forwardly and reversely in the same 180° arc of movement. The grippers G, to which additional reference will be made, will be understood to be pneumatically operated and powered through connections diagrammatically indicated at 61, 62, 63, having provision for control of phasing as diagrammatically indicated at 64, 65 and 66, so that the grippers are actuated at point of pickup and released at point of deposit.

In accordance with the present invention, each of the transfer mechanisms 31-33 includes a pair of stands 70, 70a, which are laterally spaced from one another in coaxial relation. Mounted for vertical swinging movement on the stands are gear boxes 71, 71a, a typical gear box 71 being shown in enlarged form in FIGS. 6 and 7. Here it will be noted that the gear box is thin in axial dimension and spaced closely adjacent the stand 70 which supports it. For swingably mounting the gear box 71 upon the stand 70, the stand is equipped with a stationary stubshaft, or quill, 72 mounted in spaced bearings 73. The gear boxes are oscillated in unison parallel to one another through an angle of substantially 180° from a first horizontal position downwardly and then upwardly so that the gear boxes extend in the opposite direction in a second horizontal position (FIGS. 4, 5). The driving means preferably includes a pinion 75 journalled at the bottom of the stand 70 driving an idler gear 76 which in turn drives a circular rack 77 mounted upon the side of the gear box. It will be understood that the drive includes suitable means (not specifically shown) for reversing the motion of the driving means 51, 52, 53 at the respective horizontal positions and means may, in addition, be incorporated for causing the mechanism to "dwell" at the horizontal positions for operation of the grippers.

In accordance with the present invention, the gear boxes 71, 71a are provided with arms of equal length 81, 81a, each gear box and its arm being pivoted together at adjacent ends. For this purpose the gear box 71 has a stubshaft 82 journalled in bearings 83, the stubshaft being received in a hole 84 in the arm and with the arm being held captive thereon by a nut 85 and key 86. The arms 81, 81a swing in planes closely adjacent to the gear boxes 71, 71a, which support them to provide a wide clearance space CS (see FIG. 3) for passage of the workpiece W between them.

In carrying out the present invention, means are provided for swinging the arms 81, 81a about their respective gear boxes with a scissoring motion so that, as the gear boxes move from their first to second horizontal positions, the arms are also swung between first and second horizontal positions in which the grippers at the ends of the arms overlie receptacles for the picking up and depositing of the workpiece, respectively.

Such movement of the arm 81, as shown in FIGS. 6 and 7, is brought about by providing, in the gear box 71, an input gear 91, an output gear 92, and a central idler gear 93, lying in the same plane, the input gear being twice the diameter of the output gear. The input gear is coaxial with respect to the stubshaft or quill 72 upon which the gear box is swingably mounted and, in addition, the input gear is anchored with respect to the supporting stand 70, which is to say that the input gear 91 is stationary. Anchoring is accomplished in the present instance by providing a key 94 between the stubshaft 72 on the stand and the input gear 91. Because the input gear 91 and output gear 92 are separated by only a single idler, the gears have the same "directionality", but any odd number of idlers may be used.

As the result of such directionality and as the result of making the input gear 91 twice as great in diameter as the output gear 92, the downward, and then upward, swinging of the gear box 71 is accompanied by inward scissoring movement of the arm 81 at a rate, with respect to the gear box, which is twice as great as the rate of swing of the gear box itself.

Accordingly, as the gear box 71 moves from its first horizontal position to its second horizontal position the arm 81 (with its companion 81a) moves in unison from a first, left-hand, horizontal position to a second, right-hand, horizontal position resulting in the total "throw" which is more than four times as great as the center-to-center dimension $L_1$ of the gear box.

Further in accordance with the invention there is provided, between the ends of the arms 81, 81a, a cross shaft 100, the ends of which are preferably of square cross-section received in openings of corresponding shape formed in collars 101, 101a which are respectively journalled in bearings 102, 102a. The cross shaft 100 is preferably threaded to facilitate inward and outward adjustment of the gripper spacing.

Where it is desired to maintain the orientation of the workpiece from the point of pick-up to the point of depositing, means are provided for relatively rotating the cross shaft 100, and the grippers which it carries, through 180° with respect to the gear boxes 71, 71a during the course of transferring motion, thereby nullifying the 180° swing of the gear boxes. This is accomplished by providing input and output sprockets at the respective ends of the arms 81, 81a, the sprockets being interconnected by a chain, the input sprocket being anchored to the associated gear box, and coaxial with the stubshaft 72 therein, the output sprocket being connected to the cross shaft, with the input sprocket being one-half of the diameter of the output sprocket. Referring to FIGS. 6 and 7, the input sprocket indicated at 111 is cnnected to output sprocket 112, which is secured to the collar 101, by means of a chain 113, the runs of which are pressed mutually inward by means of idlers 114, 115. The sprocket 111 may be anchored in position by any desired means, for example, by a clamping screw 116 which engages the clearance opening 117 in a flange 118 which forms an integral part of the sprocket structure.

In accordance with a further important aspect of the present invention the center-to-center length of the arms 81, 81a, and which is indicated at L2 in FIG. 6, is greater than the center-to-center length of the gear box indicated at L1, with the result that the grippers and workpiece, instead of being translated in a straight line, are translated along a shallow arcuate path, for example, along the path 36 already indicated in FIG. 1, a path which laterally "clears" the supporting gear box.

The operation of the preferred form of the invention, in which the workpiece is translated along an arcuate path without changing its orientation, will be apparent upon considering the stop-motion diagram shown in FIG. 8, in which the grippers are shown in five successive positions 121–125. As the gear box 71 swings downwardly, the arm 81 scissors upwardly at a rate, with respect to the gear box, which is twice the rate of swing of the gear box. Thus it will be noted that when the grippers move from the first position 121 to the second position 122 brought about by a 45° movement of the gear box, the arm 81 has, during such interval, swung through an arc of 90° with respect to the gear box. During the same interval, the cross shaft 100, and the grippers G thereon, have swung through an arc of 45° with respect to the gear box. Such arc of swing of the grippers nullifies the arc of swing of the gear box so that the grippers in moving from first to second position do not change their orientation.

Such movement continues, with the gear box swinging downwardly through another 45°, accompanied by 90° swing of the arms and a 45° swing of the grippers with respect to the gear box so that the orientation of the grippers at mid position remains unchanged. Further swing of the gear box beyond lower dead center position is accompanied by a swing of the arm 81 to the right, causing the grippers to occupy position 124 with their orientation still unchanged. Finally, as the gear box 71 swings to its second horizontal position the arm 81 also becomes horizontal and with the result that the workpiece is deposited, upon release of the grippers, in its original "face-up" condition.

In the above discussion, the invention has been described in connection with sprockets 111, 112 with an interconnecting chain, and such is, indeed, the preferred form of the invention. However, it will be understood that the invention is not limited to the use of sprockets and sprocket chain and that the sprockets could, if desired, be replaced by gears with a series of idlers meshed between them, preferably with an odd number of idlers being used so that the input and output elements 111, 112 have the same "directionality". Since the invention is thus generic to the use of sprockets or gears, and since the term "gear" is a more general term, it will be understood to include, within it, the term "sprocket" for purposes of the present invention.

In the above description of operation it has been assumed that the workpiece is to be horizontal both upon pick-up and upon depositing. However, in accordance with one of the aspects of the present invention, means are provided for adjusting the phase of the sprocket 111 with respect to the gear box 71 to which it is anchored, thereby causing the shaft 100 to be rocked so that the grippers occupy an initial angle to accommodate an angled workpiece and with such angle being preserved to the point of depositing of the workpiece. Such adjustment of phasing may be accomplished by making the sprocket 111 rockably adjustable through a small angle, with respect to the gear box 71 which supports it, by entering the clamping screw 116 in an arcuate slot 117 as illustrated in FIG. 6a. Because of the ratio of diameter of the first sprocket 111 with respect to the second sprocket 112, the flange 118, incident to adjustment, will be rocked to an angle which is twice as great as the resulting angle of the workpiece.

Where it is desired to pick up the workpiece at one angular orientation and to deposit it at another, the drive ratio of the sprockets may be slightly modified as illustrated in FIGS. 8a and 8b. In FIG. 8a a sprocket 112' is used which is slightly smaller than the original sprocket 112 causing the workpiece W, upon deposit, to be angled in slightly "open" position. Conversely, using a sprocket 112" which is slightly larger than the original sprocket 112, the workpiece W is, upon deposit, angled in slightly "closed" position.

In accordance with the present invention, means are alternatively provided for inverting the workpiece incident to transfer so that it is deposited in a "turned over" position. This is accomplished by omitting the cross shaft 100 and by substituting therefor stubshafts 100' having grippers G' respectively mounted thereon as shown dotted in the upper portion of FIG. 3. Omission of the cross shaft enables the workpiece to be picked up by the grippers and deposited by the grippers with the grippers in inverted position without interference. If desired, the use of the cross shaft 100 may be dispensed with entirely and stubshafts may be employed in each of the modes of operation using the same set of arms 81, 81a with their associated sprockets and sprocket chain. For the purpose of immobilizing the stubshafts 100' to achieve turnover, the clamping screw 116, used to clamp the sprocket 111, may be removed so that the sprocket 111 becomes floating and, at the same time, a clamping screw 116' (see FIG. 6) may be inserted into the sprocket 112 to clamp it and the associated shaft and gripper rigidly with respect to the arm. With the grippers in rigid condition, turnover results as set forth in the stop motion diagram, FIG. 9, the five stop motion points being illustrated at 131–135. In this mode of operation, the grippers, and workpiece, form an extension of the arms 81, 81a, and since such arms, from point of pick-up to point of deposit, undergo 180° of absolute movement, the workpiece will also swing through 180° to its inverted position for dropping by the grippers, each of which preferably has two clearable jaws.

In the modification illustrated in FIG. 9, it will be noted that the workpiece W rotates in a clockwise direction for turnover. In accordance with one of the aspects of the present invention, the workpiece may be turned over by rotating it in a counterclockwise direction. This is achieved by using sprockets of equal diameter. For example, by reducing the diameter of sprokect 112 to a diameter 112''', which is the same as the diameter of sprocket 111, as shown in FIG. 10. The five positions of the grippers during course of transfer are illustrated at 141–145.

Because of the 1:1 ratio between the sprockets in FIG. 10, and since the first sprocket is anchored to the gear box, the second sprocket, and the shaft and gripper which is connected to it, maintain a constant orientation with respect to the gear box. Thus as the gear box rotates from its first to its final position through an angle of 180°, the grippers also rotate, in counterclockwise direction, through an angle of 180° to produce full turnover of the workpiece at point of deposit. The turnover mode of FIG. 10 may be preferred to that illustrated in FIG. 9 under certain conditions where head space between the open dies is limited — in general, either mode can be employed.

As illustrated in FIGS. 1 and 2, transfer mechanisms of the types discussed may be used in spaced series, with temporary supporting nests in between, to span any distance between adjacent presses. The term "open-topped receptacle" has been used herein as a generic term to cover both the lower die of a press and a temporary supporting nest.

While the use of stubshafts is preferred in both the shaft positions to provide maximum central clearance for passage of workpieces of large size between the arms 81, 81a, it will be apparent to one skilled in the art that the invention is not limited thereto and that a cross shaft 82' may be used in lieu of stubshafts 82, 82a (see FIG. 6), if desired, and to impart additional rigidity to the transfer mechanism.

The term "gear box" has been employed for the element 71 since, in the preferred embodiment, it is of hollow construction for the purpose of enclosing and protecting the gears 91–93. It will, however, be apparent to one skilled in the art that the gears may be mounted externally of the member 71, considering the latter simply as a swingable arm, so that the member 71 need not be box-like. Moreover, it will be apparent that in lieu of the gears 91, 92 and an interposed idler, sprockets, with interconnecting chain, may be substituted as driving elements. Accordingly, the term "gear" as applied to the driving elements mounted upon box 71 shall be construed sufficiently broadly to include the possibility of substituting sprockets with an interconnecting chain.

Moreover, while it is preferred to anchor the element 91 to the stand and the element 111 to the outer end of the gear box, it will be understood that such anchoring is not essential in the practice of the invention and that the invention, in its broader aspects, contemplates any driving means for the stubshaft 82 (and hence arm 81) which causes the arm to swing in a direction opposite to the swing on the gear box and at twice the angular rate (related to the gear box). Similarly the invention in its broader aspects contemplates any means for swinging the grippers in unison with the swing of the gear box so as to cause the grippers to remain in the same absolute orientation during the course of transferring movement as illustrated and discussed in connection with FIG. 8.

In the latter figure the workpiece is delivered without any change in its orientation. However, as discussed in connection with FIGS. 8a and 8b, a drive ratio may be chosen to produce a slight change in angle of the workpiece at the point of discharge. Consequently the term "substantially no change in orientation" shall be considered generic to both these possibilities.

A type of gripper employing jaws has been illustrated in describing the invention but it will be understood that other types of grippers, for example of the suction type, will be equally applicable depending upon the nature and weight of the workpiece being handled. Accordingly the term "gripper" shall be considered to be sufficiently broad as to include any means engageable with, and disengageable from, the workpiece.

It will be apparent that the transfer mechanism, and use of such mechanisms in multiple to provide a transfer assembly, amply fulfills the objects of the present invention. It can be shown that under conditions where the path of transfer is flat, that is, where the length of arm 81 equals the length of gear box 71, as measured from center to center, the weight of the workpiece and its supporting elements tends to be nullified so that the only power required to drive the mechanism is that which is required to overcome friction. Where the arms 81, 81a are only slightly longer than the gear boxes which support them, a shallow arc of lift is produced so that only a small amount of energy need be added to move the workpiece from its initial position to its slightly elevated, central position. Even this energy is returned to the system during the second half of the transfer cycle. Thus the transfer mechanism is capable of handling large and weighty workpieces using only moderate driving power. The relatively small power requirement and the inherent balance of the system have the additional significance that the mechanism may be operated, that is to say, oscillated, at a high rate, high enough to keep up with rapidly operated automatic press lines, smoothly and substantially free of jerkiness or vibration. By gripping of workpieces along the lateral edges and at the center thereof, extremely long pieces can be accommodated. And because of the relative rocking of the grippers long pieces can be removed from, and inserted into, the die area of an opened press even where relatively small amounts of head space exist. Finally, as an important feature of the present invention, the arcuate path of movement, which is brought about by the differential length of the gear box and the arm which is connected to it, insures that the workpiece will be "lifted" from the press die with an upward component of movement and deposited with a "lowering" movement at the point of release.

While it is preferred, for the sake of simplicity, to rotate the gear box 71 by means of a ring gear 77 which is mounted directly on the gear box (see FIGS. 5, 6 and 7) it is not necessary to employ a ring gear in the practice of the invention. Instead, the construction shown in FIG. 5a may be employed in which corresponding elements are indicated by corresponding reference numerals with addition of subscript c. In this version of the invention the supporting shaft 72c is formed into a hollow quill. The gear box is connected to gear 77c by means of a reentrant central shaft 78c joined to the gear box at its outer end by a coupling device 79c. The construction illustrated in FIG. 5a has the advantage that all of the gears 75c, 76c, and 77c may be mounted in enclosed position within the stand 70, free of the hazard of exposed gear teeth.

The invention has been described above in its preferred embodiment which includes a pair of stands coaxially spaced from one another, a pair of gear boxes, and a pair of arms arranged in mirror image and driven in unison to provide bridging support for the workpiece, thereby enabling heavy workpieces to be accommodated with balanced supporting forces. Indeed, by providing laterally spaced grippers for gripping the workpiece at the lateral edges, long workpieces may be accommodated with minimum droop.

However, it is possible, employing the present invention, to use only one-half of the system described above while still achieving the primary benefits of the invention. That is to say, the invention may be practiced by using a single stand, a single gear box, and a single arm, with a single gripper for the workpiece being mounted at the end of the arm. Such a simplified system may be visualized upon viewing FIG. 6 where it will be noted that the gear box is mounted for swinging movement upon a first stubshaft, or quill, 72. A second stubshaft 82, parallel to the first stubshaft, mounts the arm 81. A third stubshaft 100′ at the end of the arm, and parallel to the first two stubshafts, mounts a single gripper of the type set forth at G′ in FIG. 3. Since the workpiece in the simpler embodiment would normally be gripped only along one of its lateral edges, unbalance in the supporting force must be tolerated and such system would be suitable only for workpieces of relatively light construction.

Attention will next be given to an alternate form of the invention as set forth in FIGS. 11–13 in which corresponding parts are indicated by corresponding reference numerals. The difference between this version and that previously described resides in the fact that only a single gear box and arm are employed, with such elements swinging in horizontal, rather than vertical, planes. The mechanism includes a stand 270 having a gear box 271 swingably mounted upon a vertically extending stubshaft or quill 272 with spaced bearings 273 interposed therebetween. For the purpose of making an oscillating drive connection to the gear box, a shaft 278, coupled to the gear box by a coupling 279 at its outer end, extends through the hollow of the quill 272, the shaft having a pinion 274 at its inner end engaged by a rack 275 driving in opposite directions by air actuators 276, 277. The actuators are energized alternately so that the gear box oscillates through an axle of 180°.

At its outer end the gear box carries an arm 281 upon a stubshaft 282 journalled in bearings 283, the stubshaft being parallel to the quill 272 and having a coupling 284 for mounting the arm so that it swings in a plane parallel to the gear box.

Relative scissoring movement of the arm 281 is, as shown in FIGS. 12 and 13, brought about by providing, in the gear box 271, an input gear 291, an output gear 292 and a central idler gear 293, the input gear being twice the diameter of the output gear and having the same directionality. The input gear is coaxial with the quill 272 upon which the gear box is swingably mounted and is stationarily anchored thereto by means of a key 294.

The arm is somewhat longer than the gear box, measured center-to-center, so that the gripper G follows an arcuate path 295, with the gripper passing laterally clear of the gear box. Accordingly, as the gear box 271 is oscillated through an arc of 180°, the arm 281, and its gripper G, swings along an arc from an extended left-hand position indicated at 296 to an equally right-hand position 297 which may, in a practical case, be a position between the open dies of a power press.

Limitation of the angle of oscillation to 180° can be conveniently done by limit stops (not shown) arranged in the path of opposite movement of the rack 275. As in the previous embodiment, conventional means are provided for synchronously actuating the gripper G so that a workpiece is picked up in one position and released in the other.

In accordance with a still further aspect of the invention, means are provided for imparting a vertical component of movement to the gripper, as brought out by comparing FIGS. 11 and 11a. It is one of the features of the construction that the gear box 271 is not supported directly upon the stand 270 but is, instead, supported upon an interposed pedestal 300 having a vertical slide 301 which is captive in a vertical way 302 (see FIG. 11a). For moving the pedestal 300 upwardly and downwardly through a limited distance with respect to the stand, a fluid actuator 303 is employed, secured to the stand, and having a vertically extending piston rod 304 which is attached, at its upper end, to the pedestal 300. Pressure fluid is applied to the actuator 303 through a connection (not shown) at its lower end. A cushioned stop block 305 secured to the lower end of the piston rod limits its stroke.

It will be understood that when the gripper is above the first receptacle in its lefthand position indicated at 296 (FIG. 11), zero fluid pressure is applied so that the gripper is at its lower level. Pressurizing the actuator raises the pedestal 200 to the level shown in FIG. 11a, thereby "lifting" the workpiece from the first receptacle. Pressure fluid is applied to the actuator until the gripper is above the second receptacle, at which time pressure is cut off so that the actuator collapses, "lowering" the workpiece into the second receptacle, that is, "lowering" the workpiece from the position illustrated in FIG. 11a to that shown in FIG. 11. The process is reversed during the return stroke. It is to be noted that the upward and downward movement of the drive shaft 278 which accompanies the upward and downward movement of the gear box (and the gripper mounted thereon) is accommodated by relative axial slippage at the rack and pinion connection 274, 275. Alternatively the drive shaft 278 may be made stationary with the stand 270, with the relative slippage being accommodated by a spline type connection at the upper end of the shaft 278.

The embodiments described above are preferably operated to provide 180° of swing of the gear box, or gear boxes, with the arm, or arms, thereon scissoring between oppositely extending positions. However, it will be understood that the invention can be practiced, if desired, using a range of swing of the gear box which departs somewhat from 180°, and the arm pivoted to the gear box need not extend in precisely opposite directions at the extremes of movement. This possibility has been emphasized by use of the word "substantially" in connection with the 180° swing and by recognition of the fact that the respective "opposite" directions of the arm relate to general, and not precise, directions.

What is claimed is:

1. For use with a power press or the like, a transfer mechanism for transferring a large generally flat workpiece from a first horizontal open-topped receptacle to a second open-topped receptacle which is horizontally spaced therefrom, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly so that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a clearance space for passage of the workpiece between them, second alined shaft means at the respective ends of the arms, the second shaft means having gripper means for gripping the workpiece, at least one of the gear boxes having an output gear connected to the associated first shaft means, means for driving the output gear synchronized with the oscillation of the associated gear box so that the arm swings on the gear box in a direction of swing opposite to that of the gear box and relatively thereto at twice the angular rate with the result that as the gear boxes are swung from their first position to their second position by the transfer driving means the ends of the arms are swung from a first horizontal position above the first receptacle to a second horizontal position extending in the opposite direction and above the second receptacle, means for operating the gripper means cyclically so that the workpiece is removed from the first receptacle and deposited in the second, the arms being longer than the gear boxes so that the gripper means follows an arcuate path with the result that the workpiece is removed from the first receptacle with an upward component of motion and deposited in the second receptacle with a downward component of motion.

2. For use with a power press or the like, a transfer mechanism for transferring a large generally flat workpiece from a first horizontal open-topped receptacle to a second open-topped receptacle which is horizontally spaced therefrom, with at least one of the receptacles having limited vertical headspace, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly so that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a clearance space for passage of the workpiece between them, second alined shaft means at the respective ends of the arms, the second shaft means having gripper means for gripping the workpiece, at least one of the gear boxes having an output gear connected to the associated first shaft means, means for driving the output gear synchronized with the oscillation of the associated gear box so that the arms swing on the gear box in a direction of swing opposite to that of the gear box and relatively thereto at twice the angular rate so that as the gear boxes are swung from their first position to their second position by the transfer driving means the ends of the arms are swung from a first horizontal position above the first receptacle to a second horizontal position extending in the opposite direction and above the second receptacle, means for operating the gripper means cyclically so that the workpiece is removed from the first receptacle and deposited in the second, at least one of the arms having an arm output gear connected to the second shaft means, means for driving the arm output gear synchronized with the oscillation of the associated gear box and at a rate substantially equal to that of the gear box so that the gripper means rotates relative to the gear boxes through substantially 180° incident to transfer thereby nullifying the 180° swing of the gear boxes with the result that the workpiece is deposited in the second receptacle with substantially no change in orientation, the arms being longer than the gear boxes as measured from center to center so that the gripper means follows an arcuate path with the result that the workpiece is removed from the first receptacle with an upward component of motion and deposited in the second receptacle with a downward component of motion, the arcuate path being sufficiently shallow as to enable removal and deposit of the workpiece notwithstanding the limited headroom.

3. For use with a power press or the like, a transfer mechanism for transferring a large generally flat workpiece from a first horizontal open-topped receptacle to a second open-topped receptacle which is horizontally spaced therefrom, with at least one of the receptacles having limited vertical headspace, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly so that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a clearance space for passage of the workpiece between them, second alined shaft means at the respective ends of the arms, the second shaft means having gripper means for gripping the workpiece, at least one of the gear boxes having an input gear and an output gear drivingly coupled thereto, the input gear being coaxially anchored to the associated stand and the output gear being connected to the associated first shaft means, the input gear having twice the diameter of the output gear and having the same directionality so that as the gear boxes are swung from their first position to their second position by the transfer driving means the ends of the arms are swung from the first horizontal position above the first receptacle to a second horizontal position extending in the opposite direction and above the second receptacle, means for operating the gripper means cyclically so that the workpiece is removed from the first receptacle and deposited in the second, at least one of the arms having an input gear coaxial with the first shaft means and an arm output gear drivingly coupled to the arm input gear and connected to the second shaft means, the arm input gear being anchored with respect to the gear box and the arm output gear being connected to the second shaft means, the arm input gear being substantially one-half the diameter of the arm output gear so that the gripper means rotates relative to the gear boxes through substantially 180° incident to transfer thereby nullifying the 180° swing of the gear boxes with the result that the workpiece is deposited in the second receptacle with substantially no change in orientation, the arms being longer than the gear boxes as measured from center to center so that the gripper means follows an arcuate path with the result that the workpiece is removed from the first receptacle with an upward component of motion and deposited in the second receptacle with a downward component of motion, the arcuate path being sufficiently shallow as to enable removal and deposit of the workpiece notwithstanding the limited headroom.

4. For use with a power press or the like, a transfer mechanism for transferring a large generally flat workpiece from a first horizontal open-topped receptacle to a second open-topped receptacle which is horizontally spaced therefrom, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly so that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a large clearance space therebetween, second alined shaft means at the respective ends of the arms, the second shaft means having gripper means for gripping a workpiece, at least one of the gear boxes having an input gear and an output gear drivingly coupled thereto, the input gear being coaxially anchored to the associated stand and the output gear being connected to the associated first shaft means, the input gear having twice the diameter of the output gear and having the same directionality so that as the gear boxes are swung from their first position to their second position by the transfer driving means the ends of the arms are swung from the first horizontal position above the first receptacle to a second horizontal position extending in the opposite direction and above the second receptacle, means for operating the gripper means cyclically so that the workpiece is removed from the first receptacle and deposited in the second, the arms being longer than the gear boxes as measured from center to center so that the gripper means follows an arcuate path with the result that the workpiece is removed from the first receptacle with an upward component of motion and deposited in the second receptacle with a downward component of motion, the arcuate path being sufficiently shallow as to enable removal and deposite of the workpiece notwithstanding the limited headroom.

5. For use with a power press or the like, a transfer mechanism for transferring a generally flat workpiece from a first horizontal open-topped receptacle to a second open-topped receptacle which is horizontally spaced therefrom, with at least one of the receptacles having limited vertical headspace, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly so that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a clearance space for passage of the workpiece between them, second alined shaft means at the respective ends of the arms, the second shaft means having grippers facing mutually inwardly and substantially spaced from one another for gripping respective lateral edges of the workpiece, at least one of the gear boxes having an input gear and an output gear drivingly coupled thereto, the input gear being coaxially anchored to the associated stand and the output gear being connected to the associated first shaft means, the input gear having twice the diameter of the output gear and having the same directionality so that as the gear boxes are swung from their first position to their second position by the transfer driving means the ends of the arms are swung from a first horizontal position above the first receptacle to a second horizontal position extending in the opposite direction and above the second receptacle, means for operating the grippers cyclically so that the workpiece is removed from the first receptacle and deposited in the second, at least one of the arms having an arm input gear coaxial with the first shaft means and an arm output gear coupled to the arm input gear and connected to the second shaft means, the arm input gear being anchored with respect to the gear box and the output gear being connected to the second shaft means, the arm input gear being substantially one-half the diameter of the arm output gear so that the grippers rotate, relative to the gear boxes, substantially through 180° incident to transfer thereby nullifying the 180° swing of the gear boxes with the result that the workpiece is deposited in the second receptacle with substantially no change in orientation.

6. For use with a power press or the like, a transfer mechanism for transferring a large generally flat workpiece from a first horizontal open-topped receptacle to a second open-topped receptacle which is horizontally spaced therefrom, the combination comprising a pair of stands having transverse axes and coaxially spaced from one another, transfer driving means, a pair of gear boxes of limited axial dimension and of equal length swingably mounted closely adjacent respective stands and having a reversible connection with the driving means for oscillating the gear boxes in unison parallel to one another through substantially 180° from a first horizontal position downwardly and then upwardly so that the gear boxes extend in the opposite direction in a second horizontal position, the gear boxes having alined stubshafts journaled at their respective ends, parallel arms of equal length connected to the respective stubshafts, alined shaft means at the ends of the arms, gripper means on the shaft means, each gear box having an input gear and an output gear, the input gear being anchored to the associated stand and the output gear being connected to the associated stubshaft, the input gear having twice the diameter of the output gear and having the same directionality so that as the gear boxes are swung from their first position to their second position by the transfer driving means the arms are swung from a first horizontal position above the first receptacle to a second horizontal position extending in the opposite direction and above the second receptacle, means for cyclically operating the gripper means so that the workpiece is removed from the first receptacle and deposited in the second, the arms being longer than the gear boxes from center to center so that the gripper means follows a shallow arcuate path with the result that the workpiece is removed from the first receptacle with an upward component of motion and deposited in the second receptacle with a downward component of motion.

7. For use with a power press or the like, a transfer mechanism for transferring a large generally flat workpiece from a first horizontal open-topped receptacle to a second open-topped receptacle which is horizontally spaced therefrom, with at least one of the receptacles having limited vertical headspace, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly so that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a clearance space for passage of the workpiece between them, second alined shaft means at the respective ends of the arms, the second shaft means having gripper means for gripping the workpiece, at least one of the gear boxes having an output gear connected to the associated first shaft means, means for driving the output gear synchronized with the oscillation of the associated gear box so that the arm swings on the gear box in a direction of swing opposite to that of the gear box and relatively thereto at twice the angular rate so that as the gear boxes are swung from their first position to their second position by the transfer driving means the ends of the arms are swung from a first horizontal position above the first receptacle to a second horizontal position extending in the opposite direction and above the second receptacle, means for operating the gripper means cyclically so that the workpiece is removed from the first receptacle and deposited in the second, at least one of the arms having an arm output gear connected to the second shaft means, means including a coupling for driving the arm output gear synchronized with the oscillation of the associated gear box and at a rate equal to that of the gear box so that the gripper means rotates, relative to the gear boxes, through substantially 180° incident to transfer thereby nullifying the 180° swing of the gear boxes with the result that the workpiece is deposited in the second receptacle with substantially no change in orientation, means for disabling the coupling and for anchoring the second shaft means to the arm for producing alternative inversion of the workpiece, the arms being longer than the gear boxes as measured from center to center so that the gripper means follows an arcuate path with the result that the workpiece is removed from the first receptacle with an upward component of motion and deposited in the second receptacle with a downward component of motion, the arcuate path being sufficiently shallow so as to enable removal and deposit of the workpiece notwithstanding the limited headroom.

8. For use with a power press or the like, a transfer mechanism for transferring a large generally flat workpiece from a first horizontal open-topped receptacle to a second open-topped receptacle which is horizontally spaced therefrom, with at least one of the receptacles having limited vertical headspace, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly so that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a clearance space for passage of the workpiece between them, second alined shaft means at the respective ends of the arms, the second shaft means having gripper means for gripping the workpiece, at least one of the gear boxes having an input gear and an output gear drivingly coupled thereto, the input gear being coaxially anchored to the associated stand and the output gear being connected to the associated first shaft means, the input gear having twice the diameter of the output gear and having the same directionality so that as the gear boxes are swung from their first position to their second position by the transfer driving means the ends of the arms are swung from the first horizontal position above the first receptacle to a second horizontal position extending in the opposite direction and above the second receptacle, means for operating the gripper means cyclically so that the workpiece is removed from the first receptacle and deposited in the second, at least one of the arms having an arm input gear coaxial with the first shaft means and an arm output gear coupled to the arm input gear and connected to the second shaft means, the arm input gear being anchored with respect to the gear box and the arm output gear being connected to the second shaft means, the arm input gear being one-half the diameter of the arm output gear so that the gripper means rotates, relative to the gear boxes, substantially 180° incident to transfer thereby nullifying the 180° swing of the gear boxes with the result that the workpiece is deposited in the second receptacle with substantially no change in orientation, means for disabling the arm input gear and for alternatively anchoring the arm output gear to the associated arm for producing alternative inversion of the workpiece during the course of transfer, the arm input and output gears being in the form of sprockets interconnected by a sprocket chain, the arms being longer than the gear boxes as measured from center to center so that the gripper means follows an arcuate path with the result that the workpiece is removed from the first receptacle with an upward component of motion and deposited in the second receptacle with a downward component of motion, the arcuate path being sufficiently shallow as to enable removal and deposit of the workpiece notwithstanding the limited headroom.

9. For use with a power press or the like, a transfer mechanism for transferring a generally flat workpiece from a first horizontal open-topped receptacle to a second open-topped receptacle which is horizontally spaced therefrom, the combination comprising a pair of stands having transverse axes and coaxially spaced from one another, transfer driving means, a pair of gear boxes of limited axial dimension and of equal length swingably mounted closely adjacent respective stands and having a reversible connection with the driving means for oscillating the gear boxes in unison parallel to one another thereough substantially 180° from a first horizontal position downwardly and then upwardly so that the gear boxes extend in the opposite direction in a second horizontal position, the gear boxes having alined stubshafts journaled at their respective ends, parallel arms of equal length connected to the respective stubshafts, alined shaft means at the ends of the arms, gripper means on the shaft means, each gear box having an input gear and an output gear, the input gear being anchored to the associated stand and the output gear being connected to the associated stubshaft, the input gear having twice the diameter of the output gear and having the same directionality so that as the gear boxes are swung from their first position to their second position by the transfer driving means, the arms are swung from a first horizontal position above the first receptacle to a second horizontal position extending in the opposite direction and above the second receptacle, means for cylically operating the gripper means so that the workpiece is removed from the first receptacle and deposited in the second, each gear box being in the form of an axially thin hollow structure journaling an idler gear interposed between the input gear and the output gear, the arms being longer than the gear boxes from center to center so that the gripper means follow a shallow arcuate path with the result that the workpiece is removed from the first receptacle with an upward component of motion and deposited on the second receptacle with a downward component of motion.

10. The combination as claimed in claim 2 in which the second receptacle is an angled die and in which the gripper means incident to transfer rotates through an angle which differs slightly from 180° so that the workpiece is deposited in the die in correspondingly angled position.

11. The combination as claimed in claim 3 in which the arm input gear departs slightly from a diameter one-half of the arm output gear so that the grippers occupy a different angle in the respective positions of removal and deposit.

12. The combination as claimed in claim 2 in which means are provided for varying the phase of the gripper means slightly relative to the gear box so that the workpiece is both removed from the first receptacle and deposited in the second at the same angular orientation, the angular orientation differing slightly from the horizontal.

13. The combination as claimed in claim 3 in which an anchoring means is provided between the arm input gear and the gear box, the anchoring means including provision for adjusting the relative phase of the input gear with respect to the gear box so that the workpiece is both removed from the first receptacle and deposited in the second at the same angular orientation, the angular orientationdiffering slightly from the horizontal.

14. For use between a pair of power presses, a transfer mechanism for transferring a generally flat workpiece from an open die at the first press to an open die at the second, the combination comprising a longitudinally extending carriage having its ends extending adjacent to the respective presses, first, second and third transfer mechanisms located respectively at one end of the carriage, at the center of the carriage, and at the other end of the carriage, nests between adjacent transfer mechanisms for temporary support of the transferred workpiece, each of the transfer mechanisms comprising a pair of stands laterally spaced from one another, transfer driving means, a pair of associated gear boxes of equal length swingably mounted upon the respective stands and having a reversible connection with the driving means for oscillating the paired gear boxes in unison parallel to one another through substantial 180° from the first horizontal position downwardly and then upwardly so that the gear boxes extend in the opposite direction in a second horizontal position, the paired gear boxes having first alined shaft means at their respective ends, arms of equal length secured to the shaft means in spaced parallel relation, second alined shaft means at the ends of the arms, gripper means on the second aligned shaft means, at least one of the gear boxes having an input gear drivingly coupled to an output gear, the input gear being anchored to the associated stand and the output gear being connected to the first alined shaft means, the input gear having twice the diameter of the output gear and having the same directionality so that as the gear boxes are swung from their first position to their second position by the transfer driving means the arms are swung from a first horizontal position to a second horizontal position, the gear boxes being so phased with the driving means and the grippers being so phased with respect to the gear boxes that a workpiece is sequentially (a) removed by the first transfer mechanism from the die of the first press and deposited in the first nest, (b) removed from the first nest by the second transfer mechanism and deposited in the second nest, and (c) removed from the second nest by the third transfer mechanism and deposited in the die of the second press.

15. For use between a pair of power presses, a transfer mechanism for transferring a large generally flat workpiece from an open die at the first press to an open die at the second, the combination comprising a longitudinally extending carriage having its ends extending adjacent to the presses, at least two transfer mechanisms located on the carriage in series relation, nest means between adjacent transfer mechanisms for temporary support of the transferred workpiece, each of the transfer mechanisms comprising a pair of stands having transverse axes and coaxially spaced from one another, transfer driving means, a pair of gear boxes of equal length pivotally mounted in opposition closely adjacent the respective stands and having a reversible connection with the driving means for oscillating the paired gear boxes in unison parallel to one another through an angle of substantially 180° from a first horizontal position downwardly and then upwardly so that the gear boxes extend in the opposite direction in a second horizontal position, the paired gear boxes having first alined shaft means at the ends thereof and having paired arms of equal length connected thereto and spaced to provide a clearance space for passage of the workpiece between them, second alined shaft means at the respective ends of the paired arms, the second shaft means having gripper means for gripping the workpiece, at least one of the gear boxes of each pair having an output gear connected to the associated first shaft means, means for driving the output gear synchronized with the oscillation of the associated gear box so that the arm swings on the gear box in a direction of swing opposite to that of the gear box with the result that as the paired gear boxes are swung from their first position to their second position by the transfer driving means the ends of the arms are swung from a first horizontal position to a second horizontal position extending in the opposite direction, at least one of the arms of each pair having an arm output gear connected to the second shaft means, means for driving the arm output gear synchronized with the oscillation of the associated gear box and at a rate substantially equal to that of the gear box so that the gripper means rotates relative to the associated gear boxes through 180° incident to transfer thereby nullifying the 180° swing of the gear boxes with the result that the workpiece passes from the first press to the second press with substantially no change in orientation, the arms being longer than the associated gear boxes as measured from center to center so that the workpiece is removed from the first press with an upward component of motion and deposited in the second press with a downward component of motion.

16. For use with a power press or the like, a transfer mechanism for transferring a large generally flat workpiece from a first horizontal open-topped receptacle to a second open-topped receptacle which is horizontally spaced therefrom, with at least one of the receptacles having limited vertical headspace, the combination comprising a pair of stands having transverse axes and coaxially spaced from one another, transfer driving means, a pair of gear boxes of equal length pivotally mounted in opposition closely adjacent the respective stands and having a reversible connection with the driving means for oscillating the gear boxes in unison parallel to one another through an angle of substantially 180° from a first horizontal position downwardly and then upwardly to that the gear boxes extend in the opposite direction in a second horizontal position, the gear boxes having first alined shaft means at the ends thereof, the gear boxes further having arms of equal length respectively connected to the first shaft means with the arms being spaced parallel to one another to provide a clearance space for passage of the workpiece between them, second alined shaft means at the respective ends of the arms, the second shaft means having gripper means for gripping the workpiece, at least one of the gear boxes having an input gear and an output gear drivingly coupled thereto, the input gear being anchored to the associated stand and the output gear being connected to the associated first shaft means, the input gear having twice the diameter of the output gear and having the same directionality so that as the gear boxes are swung from their first position to their second position by the transfer driving means the ends of the arms are swung from the first horizontal position above the first receptacle to a second horizontal position extending in the opposite direction and above the second receptacle, means for operating the gripper means cyclically and in unison so that the workpiece is removed from the first receptacle and deposited in the second, at least one of the arms having an input gear coaxial with the first shaft means and an arm output gear drivingly coupled to the arm input gear and connected to the second shaft means, the arm input gear being anchored with respect to the gear box and the arm output gear being connected to the second shaft means, the arm input gear being substantially equal to the diameter of the arm output gear so that the orientation of the grippers stays fixed with respect to the gear boxes during transfer of the workpiece with the result that the workpiece is deposited inverted in the second receptacle, the arms being longer than the gear boxes as measured from center to center so that the gripper means follows an arcuate path with the result that the workpiece is removed from the first receptacle with an upward component of motion and deposited in the second receptacle with a downward component of motion, the arcuate path being sufficiently shallow as to enable removal and deposit of the workpiece notwithstanding the limited headroom.

17. The combination as claimed in claim 3, the gripper means being in the form of a pair of grippers mounted on the second shaft means and facing mutually inwardly for gripping the lateral edges of the workpiece at substantially the center thereof, the grippers having means for adjustably positioning on the second shaft means to vary the lateral spacing thereof to conform to the spacing of the said lateral edges.

18. For use with a power press or the like, a transfer mechanism for transferring a large generally flat workpiece from a first horizontal open-topped receptacle to a second open-topped receptacle which is horizontally spaced therefrom, the combination comprising a pair of stands having transverse axes and coaxially spaced from one another, transfer driving means, a pair of gear boxes of equal length pivotally mounted in opposition closely adjacent the respective stands and having a connection with the driving means for oscillating the gear boxes in unison parallel to one another through an angle of substantially 180° from a first horizontal position downwardly and then upwardly so that the gear boxes extend in the opposite direction in a second horizontal position, the gear boxes having alined stub shafts at the ends thereof, the gear boxes further having arms of equal length respectively connected to the stub shafts and with the arms being spaced parallel to one another to provide a clearance space for passage of the workpiece between them, a cross shaft for interconnecting the ends of the arms, the cross shaft having a pair of grippers facing mutually inwardly and substantially spaced from one another for gripping the respective lateral edges of the workpiece, each of the gear boxes having an input gear and an output gear drivingly coupled thereto, the input gears being coaxial with the axis of oscillation and anchored to the respective stands, the output gears being connected to the respective stub shafts, each input gear having twice the diameter of the output gear so that as the gear boxes are swung from their first position to their second position by the transfer driving means the ends of the arms are swung from the first horizontal position above the first receptacle to a second horizontal position extending in the opposite direction and above the second receptacle, means for operating the gripper means cyclically in unison so that a workpiece is removed from the first receptacle and deposited in the second, each of the arms having an arm input gear and an arm output gear drivingly coupled thereto, the arm input gears being coaxial with the stub shaft and anchored to the respective gear boxes and the arm output gears being connected to the cross shaft, the arm input gear being substantially one-half the diameter of the arm output gear so that the cross shaft and grippers rotate relative to the gear boxes substantially 180° incident to transfer thereby nullifying the 180° swing of the gear boxes with the result that the workpiece maintains the same orientation as it is transferred from the first receptacle to the second, the arms being longer than the gear boxes as measured from center to center so that the grippers follow a shallow arcuate path with the workpiece being removed from the first receptacle with an upward component of motion and deposited in the second receptacle with a downward component of motion.

19. For use with a power press or the like, a transfer mechanism for transferring a large generally flat workpiece from a first horizontal open-topped receptacle to a second open-topped receptacle which is horizontally spaced therefrom, the combination comprising a stand having a transverse axis, transfer driving means, an elongated gear box pivotally mounted on the stand and closely adjacent thereto, the gear box having a reversible connection with the driving means for oscillating the gear box through an angle of substantially 180° from a first horizontal position downwardly and then upwardly so that the gear box extends in the opposite direction in a second horizontal position, the gear box having a first shaft at the end thereof parallel to the axis of oscillation, an arm connected to the shaft, the arm having a second shaft at the end thereof parallel to the first shaft, the second shaft means having a gripper for gripping the workpiece, the gear box having an output gear connected to the first shaft, means for driving the output gear synchronized with the oscillation of the gear box so that the arm swings on the gear box in a direction of swing opposite to that of the gear box and relatively thereto at twice the angular rate with the result that as the gear box is swung from its first position to its second position by the transfer driving means the end of the arm is swung from a first horizontal position above the first receptacle to a second horizontal position extending in the opposite direction and above the second receptacle, means for operating the gripper cyclically so that the workpiece is removed from the first receptacle and deposited in the second, the arm being longer than the gear box so that the gripper follows an arcuate path with the result that the workpiece is removed from the first receptacle with an upward component of motion and deposited in the second receptacle with a downward component of motion.

20. For use with a power press or the like, a transfer mechanism for transferring a large generally flat workpiece from a first horizontal open-topped receptacle to a second open-topped receptacle which is horizontally spaced therefrom, with at least one of the receptacles having limited vertical headspace, the combination comprising a stand having a transverse axis, transfer driving means, an elongated gear box pivotally mounted on the stand and closely adjacent thereto, the gear box having a reversible connection with the driving means for oscillating the gear box through an angle of substantially 180° from a first horizontal position downwardly and then upwardly so that the gear box extends in the opposite direction in a second horizontal position, the gear box having a first shaft at the end thereof parallel to the axis of oscillation, an arm connected to the first shaft, the arm having a second shaft at the end thereof parallel to the first shaft, the second shaft having a gripper for gripping the workpiece, the gear box having an input gear and an output gear drivingly coupled thereto, the input gear being coaxially anchored to the stand and the output gear being connected to the first shaft, the input gear having twice the diameter of the output gear and having the same directionality so that as the gear box is swung from its first position to its second position by the transfer driving means the end of the arm is swung from the first horizontal position above the first receptacle to a second horizontal position extending in the opposite direction and above the second receptacle, means for operating the gripper cyclically so that the workpiece is removed from the first receptacle and deposited in the second, the arm having an arm input gear coaxial with the first shaft and an arm output gear drivingly coupled to the arm input gear and connected to the second shaft, the arm input gear being anchored with respect to the gear box and the arm output gear being connected to the second shaft, the arm input gear being substantially one-half the diameter of the arm output gear so that the gripper rotates relative to the gear box through substantially 180° incident to transfer thereby nullifying the 180° swing of the gear box with the result that the workpiece is deposited in the second receptacle with substantially no change in orientation, the arm being longer than the gear box as measured from center to center so that the gripper means follows an arcuated path with the result that the workpiece is removed from the first receptacle with an upward component of motion and deposited in the second receptacle with a downward component of motion, the arcuate path being sufficiently shallow as to enable removal and deposit of the workpiece notwithstanding the limited headroom.

21. For use with a power press or the like, a transfer mechanism for transferring a large generally flat workpiece from a first horizontal open-topped receptacle to a second open-topped receptacle which is horizontally spaced therefrom, the combination comprising a stand, a transversely extending first stub shaft on the stand, transfer driving means, a gear box pivoted to the first stub shaft and having a connection with the driving means for oscillating the gear box through an angle of substantially 180° from a first horizontal position downwardly and then upwardly so that the gear box extends in the opposite direction in a second horizontal position, the gear box having a second stub shaft at the outer end thereof parallel to the first stub shaft, an arm on the second stub shaft for scissoring movement with respect to the gear box, a third stub shaft journaled at the end of the arm parallel to the first and second stub shafts, a gripper on the third stub shaft for gripping the lateral edge of the workpiece, the gear box having an input gear and an output gear drivingly coupled thereto, the input gear being coaxial with the axis of oscillation and anchored to the stand, the output gear being connected to the second stub shaft, the input gear having twice the diameter of the output gear and of the same directionality so that as the gear box is swung from its first position to its second position by the transfer driving means the end of the arm is swung from a first horizontal position above the first receptacle to a second horizontal position extending in the opposite direction and above the second receptacle, means for operating the gripper means cyclically so that a workpiece is removed from the first receptacle and deposited in the second, the arm having an arm input gear and an arm output gear drivingly coupled thereto, the arm input gear being coaxial with the second stub shaft and anchored to the gear box and the arm output gear being connected to the third stub shaft, the arm input gear being substantially one-half the diameter of the arm output gear so that the third stub shaft and the gripper thereon rotates relative to the gear box substantially 180° incident to transfer thereby nullifying the 180° swing of the gear box with the result that the workpiece maintains the same orientation as it is transferred from the first receptacle to the second, the arm being longer than the gear box as measured from center to center so that the gripper follows a shallow arcuate path with the workpiece being removed from the first receptacle with an upward component of motion and deposited in the second receptacle with a downward component of motion.

22. For use with a power press or the like, a transfer mechanism for transferring a workpiece between a first receptacle and a second receptacle which is horizontally spaced therefrom, the combination comprising a stand mounted between the receptacles, a gear box of axially thin, elongated construction, means including a first stub shaft for pivotally mounting the gear box on the stand for swinging movement, means including a reversible driving connection on the stand coupled to the gear box for oscillating the gear box back and forth through an angle of substantially 180° so that the gear box moves between a first horizontal position in which the gear box points in a first direction and a second horizontal position in which the gear box points in the opposite direction, the gear box having an arm at the end thereof, the gear box having a second stub shaft spaced from the first stub shaft for mounting the arm for scissoring movement in a plane parallel to the gear box, the stub shafts being arranged parallel to one another at the respective ends of the gear box, a gripper mounted at the end of the arm for gripping the workpiece, the gear box having an input gear and an output gear drivingly coupled thereto, the input gear being anchored to the stand coaxially with the first stub shaft and the output gear being connected to the second stub shaft for imparting to the arm relative swinging movement, the input gear having twice the diameter of the output gear and having the same directionality so that as the gear box is swung 180° from its first position to its second position by the driving means, the arm undergoes scissoring movement with respect to the gear box accompanied by movement of the gripper from a first position above the first receptacle to a second position extended in the opposite direction and above the second receptacle, means for closing the gripper upon a workpiece at the first receptacle and for releasing the gripper from the workpiece at the second receptacle, and means for imparting a lifting movement to the gripper incident to removal of a workpiece from the first receptacle and a lowering movement to the gripper incident to depositing the workpiece in the second receptacle.

23. For use with a power press or the like, a transfer mechanism for transferring a workpiece between a first receptacle and a second receptacle which is horizontally spaced therefrom, the combination comprising a stand mounted between the receptacles, a gear box of axially thin, elongated construction, means including a first stubshaft for pivotally mounting the gear box on the stand for swinging movement, means including a reversible driving connection coupled to the gear box for oscillating the gear box back and forth through an angle of substantially 180° so that the gear box moves between a first horizontal position in which the gear box points in a first direction and a second horizontal position in which the gear box points in the opposite direction, the gear box having an arm at the end thereof, the gear box having a second stubshaft spaced from the first stubshaft for mounting the arm for scissoring movement in a plane parallel to the gear box, the stubshafts being arranged parallel to one another at the respective ends of the gear box, a gripper mounted at the end of the arm for gripping the workpiece, the gear box having an input gear and an output gear drivingly coupled thereto, the input gear being anchored to the stand coaxially with the first stubshaft and the output gear being connected to the second stubshaft for imparting to the arm relative swinging movement, the input gear having twice the diameter of the output gear and having the same directionality so that as the gear box is swung 180° from its first position to its second position by the driving means, the arm undergoes scissoring movement with respect to the gear box accompanied by movement of the gripper from a first position above the first receptacle to a second position extended in the opposite direction and above the second receptacle, the arm being longer than the gear box so that the gripper follows a shallow arcuate path in which the gripper passes laterally of the gear box, the gears lying substantially in the same plane protectively enclosed by the gear box.

24. For use with a power press or the like, a transfer mechanism for transferring a workpiece between a first receptacle and a second receptacle which is horizontally spaced therefrom, the combination comprising a stand mounted between the receptacles, a gear box of axially thin, elongated construction, means including a first stubshaft for pivotally mounting the gear box on the stand for swinging movement, means including a reversible driving connection coupled to the gear box for oscillating the gear box back and forth through an angle of substantially 180° so that the gear box moves between a first horizontal position in which the gear box points in a first direction and a second horizontal position in which the gear box points in the opposite direction, the gear box having an arm at the end thereof, the gear box having a second stubshaft spaced from the first stubshaft for mounting the arm for scissoring movement in a plane parallel to the gear box, the stubshafts being arranged parallel to one another at the respective ends of the gear box, a gripper mounted at the end of the arm for gripping the workpiece, the gear box having an input gear and an output gear drivingly coupled thereto, the input gear being anchored to the stand coaxially with the first stubshaft and the output gearing being connected to the second stubshaft for imparting to the arm relative swinging movement, the input gear having twice the diameter of the output gear and having the same directionality so that as the gear box is swung 180° from its first position to its second position by the driving means the arm undergoes scissoring movement with respect to the gear box accompanied by movement of the gripper from a first position above the first receptacle to a second position extended in the opposite direction and above the second receptacle, the arm being longer than the gear box so that the gripper follows a shallow arcuate path in which the gripper passes laterally of the gear box, the first stubshaft being in the form of a hollow quill stationarily secured to the stand, a central drive shaft telescoped into the quill, the drive shaft being connected at its outer end to the gear box and having its inner end projecting into the stand for coupling to the reversible driving connection.

25. For use with a power press or the like, a transfer mechanism for transferring a workpiece between a first upwardly facing receptacle and a second upwardly facing receptacle which is horizontally spaced therefrom, the combination comprising a stand mounted between the receptacles, a gear box of axially thin, elongated construction, means including a first vertical stub shaft for pivotally mounting the gear box on the stand for swinging movement in a horizontal plane, means including a reversible driving connection coupled to the gear box for oscillating the gear box back and forth through an angle of substantially 180° so that the gear box moves between a first horizontal position in which the gear box points in a first direction and a second horizontal position in which the gear box point in the opposite direction, the gear box having an arm at the end thereof, the gear box having a second stub shaft spaced from the first stub shaft for mounting the arm for scissoring movement in a plane parallel to the gear box, the stub shafts being arranged parallel to one another at the respective ends of the gear box, a gripper mounted at the end of the arm for gripping the workpiece, the gear box having an input gear and an output gear drivingly coupled thereto, the input gear being anchored to the stand coaxially with the first stub shaft and the output gear being connected to the second stub shaft for imparting to the arm relative swinging movement, the input gear having twice the diameter of the output gear and having the same directionality so that as the gear box is swung 180° from its first position to its second position by the driving means, the arm undergoes scissoring movement with respect to the gear box accompanied by movement of the gripper from a first position above the first receptacle to a second position extended in the opposite direction and above the second receptacle, and means connected to the first stub shaft for moving the gear box with its arm and gripper upwardly at the first receptacle and downwardly at the second receptacle.

26. For use with a power press or the like, a transfer mechanism for transferring a workpiece between a first upwardly facing receptacle and a second upwardly facing receptacle which is horizontally spaced therefrom, the combination comprising a stand mounted between the receptacles, a gear box of axially thin, elongated construction, a vertically movable pedestal on the stand, means including a first vertical stub shaft on the pedestal for pivotally mounting the gear box for swinging movement in a horizontal plane, means including a reversible driving connection coupled to the gear box for oscillating the gear box back and forth through an angle of substantially 180° so that the gear box moves between a first horizontal position in which the gear box points in a first direction and a second horizontal position in which the gear box points in the opposite direction, the gear box having an arm at the end thereof, the gear box having a second stub shaft spaced from the first stub shaft for mounting the arm for scissoring movement in a plane parallel to the gear box, the stub shafts being arranged parallel to one another at the respective ends of the gear box, a gripper mounted at the end of the arm for gripping the workpiece, the gear box having an input gear and an output gear drivingly coupled thereto, the input gear being anchored to the pedestal coaxially with the first stub shaft and the output gear being connected to the second stub shaft for imparting to the arm relative swinging movement, the input gear having twice the diameter of the output gear and having the same directionality so that as the gear box is swung 180° from its first position to its second position by the driving means, the arm undergoes scissoring movement with respect to the gear box accompanied by movement of the gripper from a first position above the first receptacle to a second position extended in the opposite direction and above the second receptacle, and means including an actuator connected to the pedestal for moving the pedestal upwardly with respect to the stand accompanied by upward movement of the gripper at the first receptacle and for moving the pedestal downwardly with respect to the stand accompanied by downward movement of the gripper at the second receptacle.

27. For use with a power press or the like, a transfer mechanism for transferring a workpiece between a first upwardly facing receptacle and a second upwardly facing receptacle which is horizontally spaced therefrom, the combination comprising a stand mounted between the receptacles, a gear box of axially thin, elongated construction, a vertically movable pedestal on the stand, means including a first vertical stub shaft on the pedestal for pivotally mounting the gear box for swinging movement, means including a reversible driving connection coupled to the gear box for oscillating the gear box back and forth through an angle of substantially 180° so that the gear box moves between a first horizontal position in which the gear box points in a first direction and a second horizontal position in which the gear box points in the opposite direction, the gear box having an arm at the end thereof, the gear box having a second stub shaft spaced from the first stub shaft for mounting the arm for scissoring movement in a plane parallel to the gear box, the stub shafts being arranged parallel to one another at the respective ends of the gear box, a gripper mounted at the end of the arm for gripping the workpiece, the gear box having an input gear and an output gear drivingly coupled thereto, the input gear being anchored to the pedestal coaxially with the first stub shaft and the output gear being connected to the second stub shaft for imparting to the arm relative swinging movement, the input gear having twice the diameter of the output gear and having the same directionality so that as the gear box is swung 180° from its first position to its second position by the driving means the arm undergoes scissoring movement with respect to the gear box accompanied by movement of the gripper from a first position above the first receptacle to a second position extended in the opposite direction and above the second receptacle, the arm being longer than the gear box so that the gripper follows a shallow arcuate path in which the gripper passes laterally of the gear box, the first stub shaft being in the form of a hollow quill stationarily secured to the pedestal, a central drive shaft telescoped into the quill, the drive shaft being connected at its outer end to the gear box and having its inner end projecting into the stand for coupling to the reversible driving connection, means including an actuator connected to the pedestal for moving the pedestal upwardly with respect to the stand accompanied by upward movement of the gripper at the first receptacle and for moving the pedestal downwardly with respect to the stand accompanied by downward movement of the gripper at the second receptacle, the reversible driving connection being so constructed and arranged as to accommodate the vertical movement of the pedestal.

* * * * *